United States Patent [19]
Worthen et al.

[11] Patent Number: 5,506,505
[45] Date of Patent: Apr. 9, 1996

[54] APPARATUS FOR REMOTELY INDICATING PIPELINE PIG INCLUDING A SENSOR HOUSING HAVING SURFACE ENGAGING ORTHOGONALLY DISPOSED PARAMAGNETIC MATERIALS A SOLID STATE SENSOR AND A FLAG

[75] Inventors: Steven D. Worthen; Jeffrey S. Rosenberg, both of Tulsa, Okla.

[73] Assignee: TDW Delaware, Inc., Wilmington, Del.

[21] Appl. No.: 239,739

[22] Filed: May 9, 1994

[51] Int. Cl.⁶ .............................. G01V 3/08; G01R 33/07; G01N 27/72
[52] U.S. Cl. .......................... 324/326; 324/260; 324/235
[58] Field of Search .................... 324/207.20, 219–221, 324/235, 67, 326, 25.2, 260–262, 251

[56] References Cited

U.S. PATENT DOCUMENTS

| | | | |
|---|---|---|---|
| 3,109,410 | 11/1963 | Ver Nooy | 116/124 |
| 3,673,628 | 7/1972 | Sullivan | 15/104.06 R |
| 3,754,275 | 8/1973 | Carter et al. | 324/67 X |
| 4,491,018 | 1/1985 | Osburn | 116/303 |
| 4,596,204 | 6/1986 | Hicks | 73/432 R |
| 4,692,703 | 9/1987 | Extance et al. | 324/251 |
| 4,709,208 | 11/1987 | Kevr | 324/251 X |
| 4,714,888 | 12/1987 | French et al. | 324/326 |
| 4,857,851 | 8/1989 | Anderson et al. | 324/326 |
| 4,935,698 | 6/1990 | Kawaji et al. | 324/207.20 |
| 5,279,251 | 1/1994 | Ver Nooy | 116/204 |

Primary Examiner—Sandra L. O'Shea
Assistant Examiner—Roger Phillips
Attorney, Agent, or Firm—Head, Johnson & Kachigian

[57] ABSTRACT

An apparatus for non-intrusively indicating the passage of a pipeline pig having a housing adapted to be supported adjacent the exterior surface of a pipeline through which a magnet carrying pig moves, the housing containing an armature formed of pole pieces of paramagnetic material having a narrow gap therein that receives a solid-state magnetic sensing member, the sensing member providing changing electrical characteristics in response to changes in ambient magnetic field intensities, and an indicator pivotally attached to the housing and normally held in a ready position by a latch, the latch being operated by a circuit controlled by the magnetic sensing member so that the flag is released to move to an operative position in response to a changed magnetic field intensity caused by the passage of a magnet carrying pig, the armature within the housing serving to increase the sensitivity of the magnetic sensing member.

7 Claims, 6 Drawing Sheets

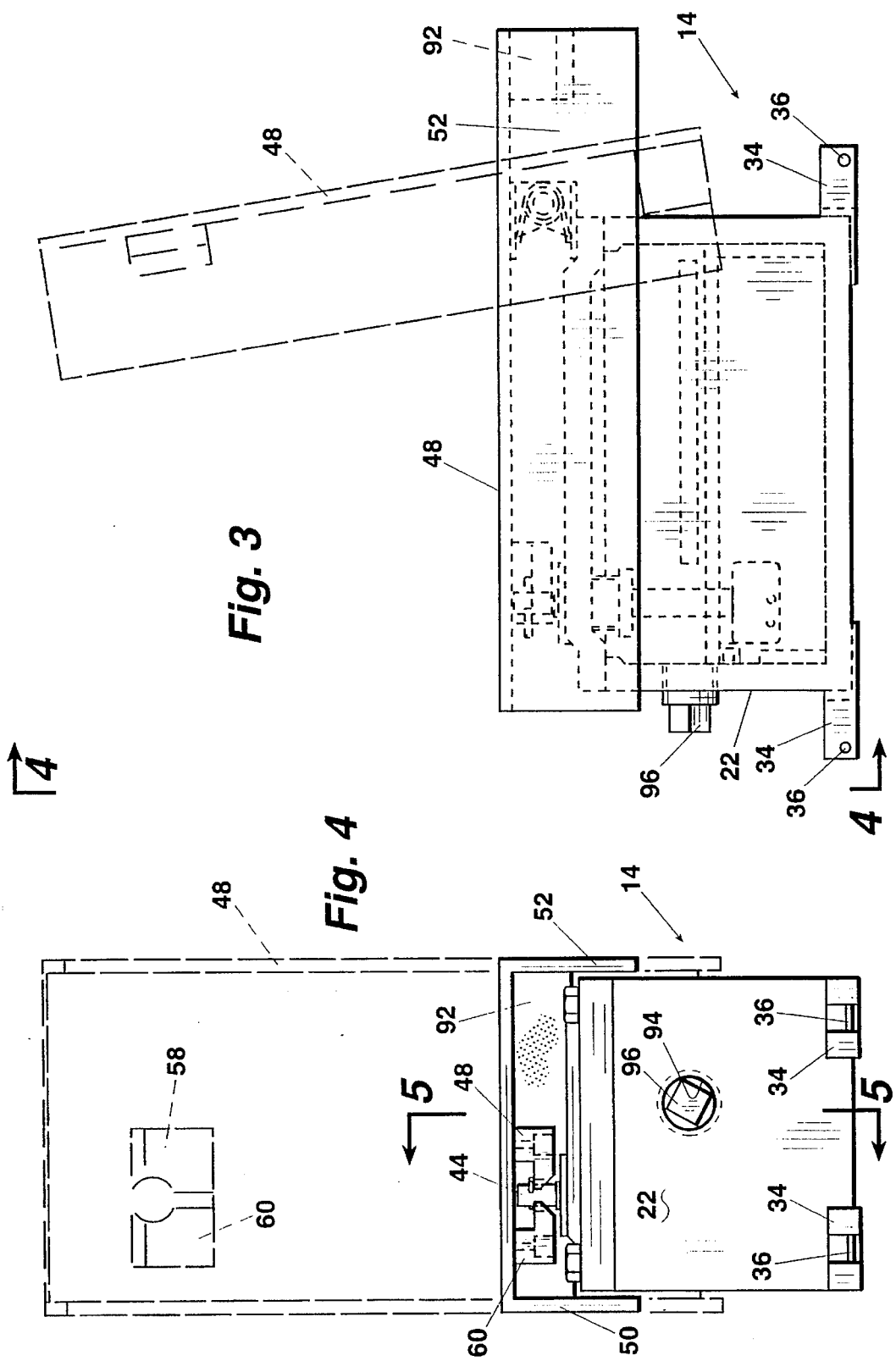

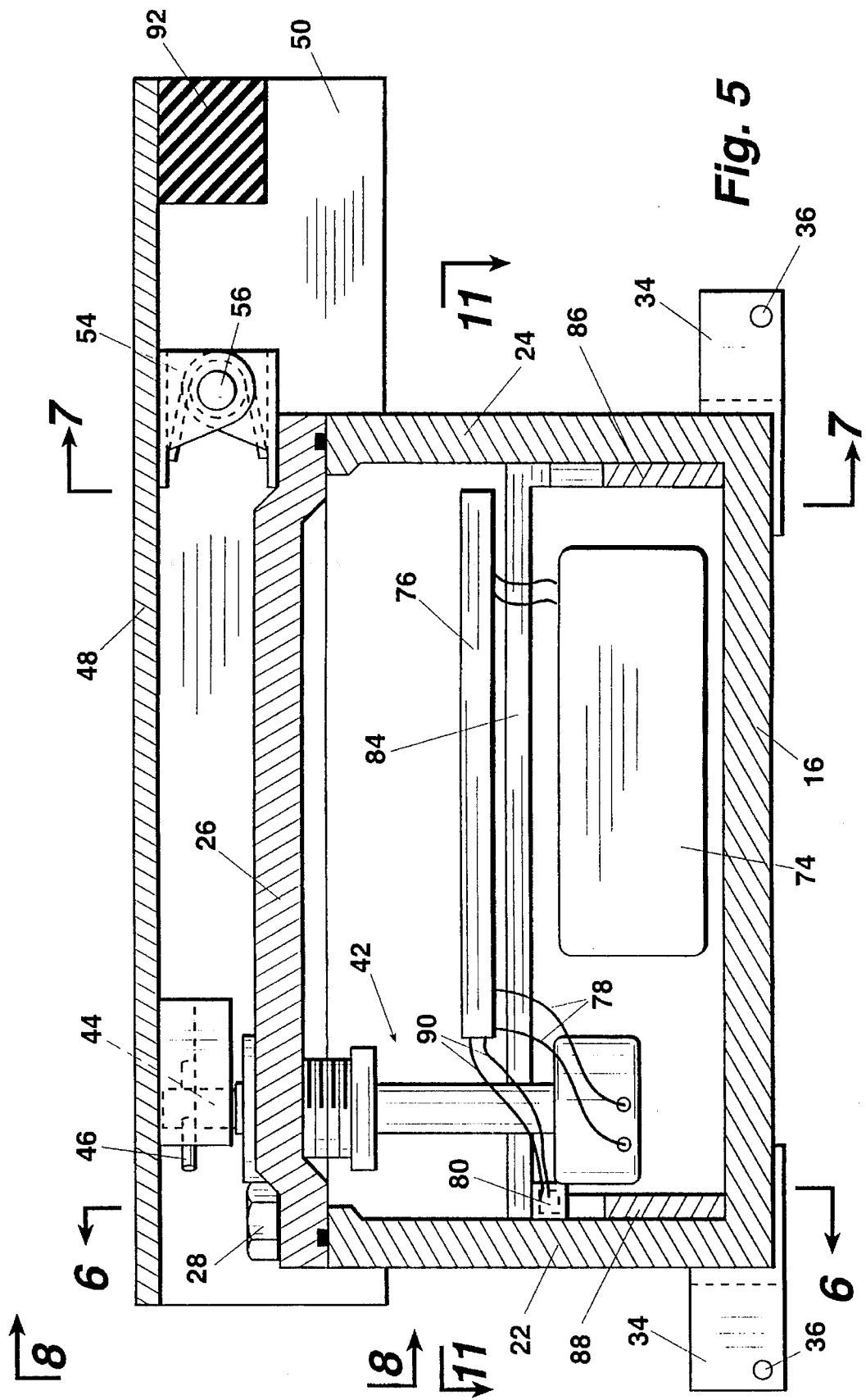

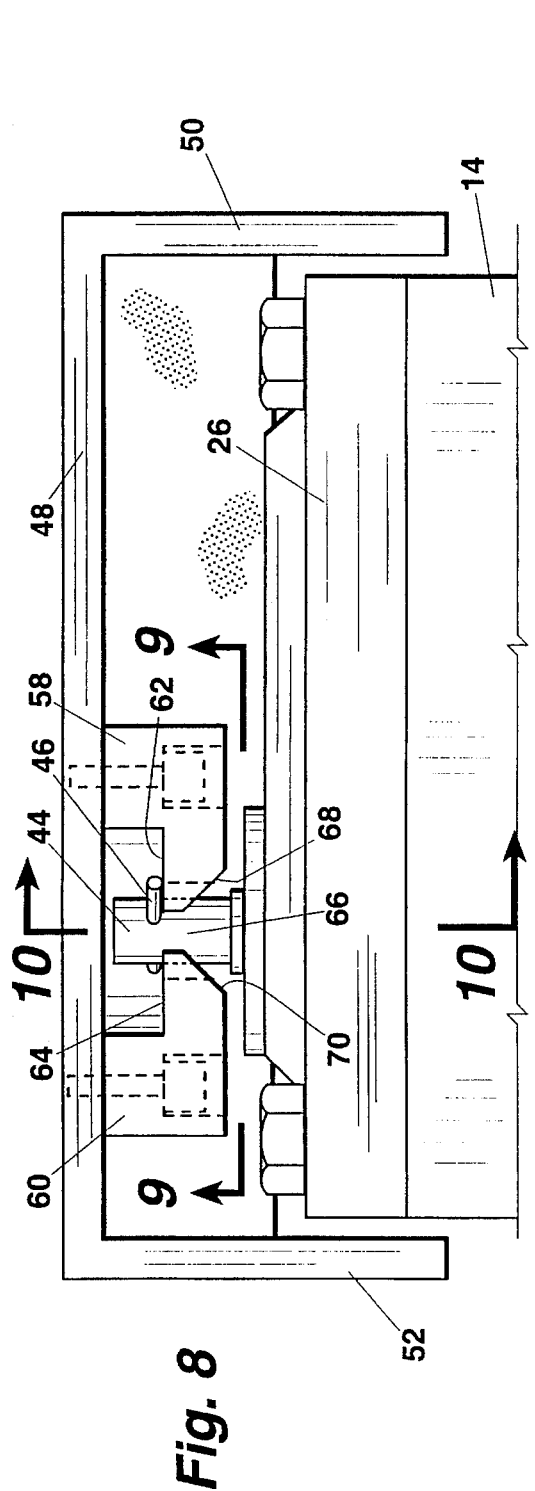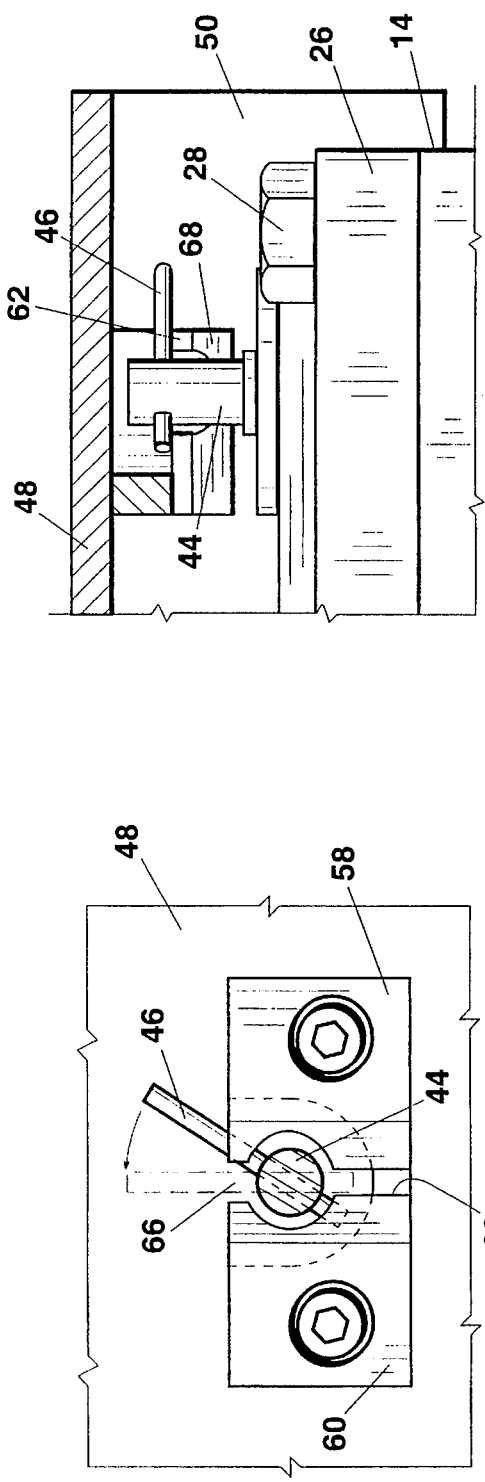

APPARATUS FOR REMOTELY INDICATING PIPELINE PIG INCLUDING A SENSOR HOUSING HAVING SURFACE ENGAGING ORTHOGONALLY DISPOSED PARAMAGNETIC MATERIALS A SOLID STATE SENSOR AND A FLAG

CROSS-REFERENCE TO RELATED APPLICATIONS

This application is not related to any pending patent applications.

CROSS-REFERENCE TO MICROFICHE APPENDIX

This application is not related to any microfiche appendix.

BACKGROUND OF THE INVENTION

Pigs are used in pipelines for many reasons including primarily:

1) Scraping the interior of a pipeline to remove rust, encrustation and other solid deposits;

2) To separate one fluid component, whether a liquid or a gas, from a different component; and 3) To provide information about the pipeline.

For whatever reason a pipeline pig is used, it is frequently important to know when the pipeline pig has passed a predetermined location. This information can be used to establish the rate of travel of the pipeline pig and to identify its location in the event the pig becomes stuck or lodged in the pipeline. Further, knowing when a pig moving through a pipeline has passed a specific location can be used for indicating when a sequential pig should be launched into a pipeline and is useful for a variety of other reasons to the operators of pipelines.

Pig signaling devices are well known in the prior art. For reference to pig signaling devices, see the following previously issued U.S. Pat. No. 3,109,410; 4,596,204; 5,279,251; 3,673,628; 4,491,018; 4,857,851 and 4,714,888.

Pig signaling devices can be classified as two basic types, that is, the intrusive type and the non-intrusive type. Intrusive type pig signaling devices include those illustrated in U.S. Pat. Nos. 3,109,410; 4,596,204; 5,279,251 and 4,491,018. The second basic class of pig signaling devices are non-intrusive, that is, where it is not necessary to penetrate the pipeline to detect the passage of a pig. These include devices such as described in U.S. Pat. No. 4,714,888 that indicate passage of a pig by changing magnetic fields, the pig having a magnet that is carried with it. U.S. Pat. No. 4,857,851 is a type of pig signaling device that employs the method of establishing an alternating magnetic field externally of the pipeline and detecting changes in the magnetic field in response to the passage of a pipeline pig.

The present invention is a non-intrusive pipeline pig signaling device that functions in cooperation with a pipeline pig carrying a magnet, that is, the pig signaling device of this invention responds to changing ambient magnetic field intensities adjacent a pipeline when a pig carrying a magnet passes through the pipeline.

SUMMARY OF THE INVENTION

This invention is an apparatus for non-intrusively indicating the passage of a pig in a pipeline. The pig is provided with a magnet so that an ambient magnetic field adjacent the pipeline changes when the magnet containing pig passes through the pipeline. The apparatus is in the form of a housing that is supported on the exterior surface of the pipeline, such as by the use of metal bands. The housing is of non-paramagnetic material, such as aluminum, and the housing has an internal peripheral surface. An armature is formed of pole pieces of paramagnetic material positioned in a U-shape within the housing and adjacent the housing internal peripheral surface, the U-shaped armature having a narrow gap therein. A solid-state magnetic sensing member is positioned in the gap in the armature. The magnetic sensing member is the type that changes electrical characteristics in response to changes in ambient magnetic field intensities.

The function of the armature is to concentrate magnetic flux intensities through the magnetic sensing member so that the sensing member more easily responds to provide a changing electrical characteristic when a magnet carrying pig passes through the pipeline.

An indicator is responsive to the changing electrical characteristics of the magnetic sensing member. This is best accomplished by connecting the magnetic sensing member to an electrical circuit supplied by an electric voltage, such as by means of a battery contained within the housing. In response to a changing magnetic field intensity detected by the sensing member, the circuit board provides an actuating signal that is used to indicate the passage of a pig.

In the preferred arrangement of this invention, an indicator is employed that is in the form of a flag member pivotally attached to the exterior of the housing. The flag member is spring biased so that it tends to move between a ready position wherein the flag member is positioned adjacent the housing and an operative position wherein the flag member extends perpendicular to the housing to thereby provide a visual signal.

The position of the flag member is controlled by rotatable shaft extending upwardly and vertically of the housing top surface. The shaft is rotated in response to a signal from the circuit board which, as previously stated, is in response to the detection of a changing magnetic field intensity by the magnetic sensor. The flag has latch members supported adjacent to each other providing a slot between. The rotatable shaft has a radially extending bar that is receivable within the slot, the bar engaging latching surfaces on the latch members to maintain the flag normally in the ready position. When the shaft is rotated in response to a changing magnetic field caused by a passing pig, the bar aligns with the slot allowing the flag to pivot to the operative position.

A better and more complete understanding of the invention will be obtained from the following detailed description of the preferred embodiments and the claims, taken in conjunction with the attached drawings.

BRIEF DESCRIPTION OF THE DRAWING

FIG. 2 shows the flag member in dotted outline in the ready position and in solid outline in the operative position. Also, FIG. 2 shows in dotted outline within the pipeline, a portion of a pig body having a magnet carried therewith. The magnet serves to actuate the indicating device to thereby cause the flag member to move to the operative position.

FIG. 3 is an enlarged external view of the apparatus for indicating the passage of a pig showing the flag in solid view in the ready position and in dotted view in the operative position.

FIG. 4 is an end view of the indicating apparatus as taken along the line 4—4 of FIG. 3.

FIG. 5 is an enlarged cross-sectional view of the indicating apparatus housing showing internal components. FIG. 5 is taken along the line 5—5 of FIG. 4 and shows the flag member in ready position.

FIG. 7 shows the configuration of a portion of the armature and shows the spring biased hinge by which the flag member is pivotally supported to the housing.

FIG. 8 is an enlarged fragmentary end view of the indicator apparatus as taken along the line 8—8 of FIG. 5 showing details of the latching mechanism.

FIG. 9 is a cross-sectional view of the latching mechanism as taken along the line 9—9 of FIG. 8.

FIG. 10 is a fragmentary cross-sectional view of the latching mechanism taken along the line 10—10 of FIG. 8.

DESCRIPTION OF THE PREFERRED EMBODIMENTS

Figure 2:
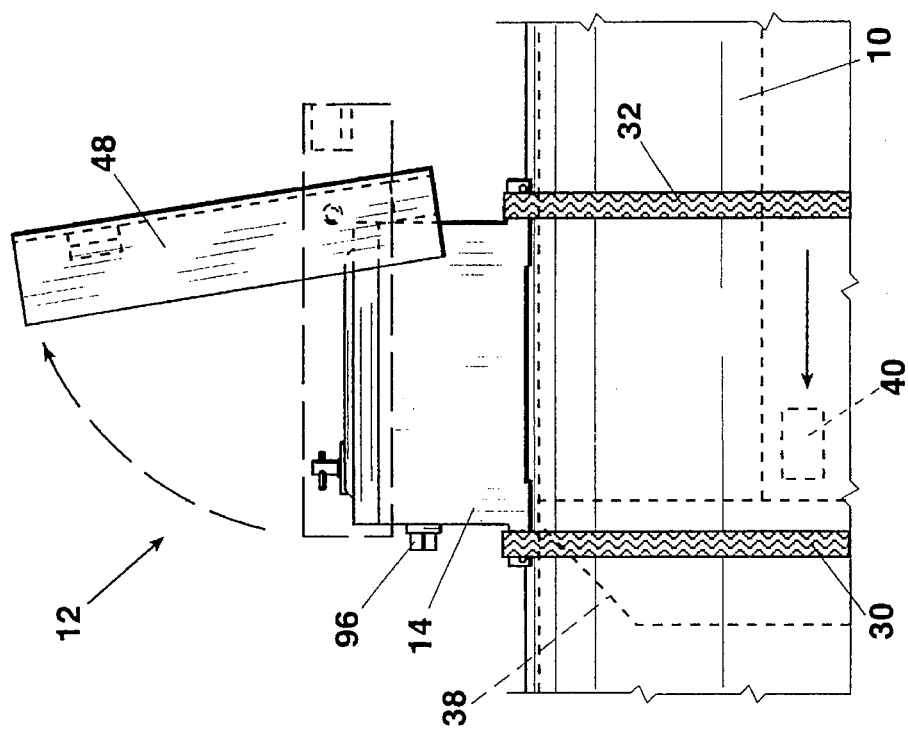
FIG. 2 is a fragmentary elevational view as taken along the line 2—2 of FIG. 1 showing an upper portion of the exterior surface of a pipeline with the apparatus for indicating the passage of a pig through the pipeline.
Figure 1:
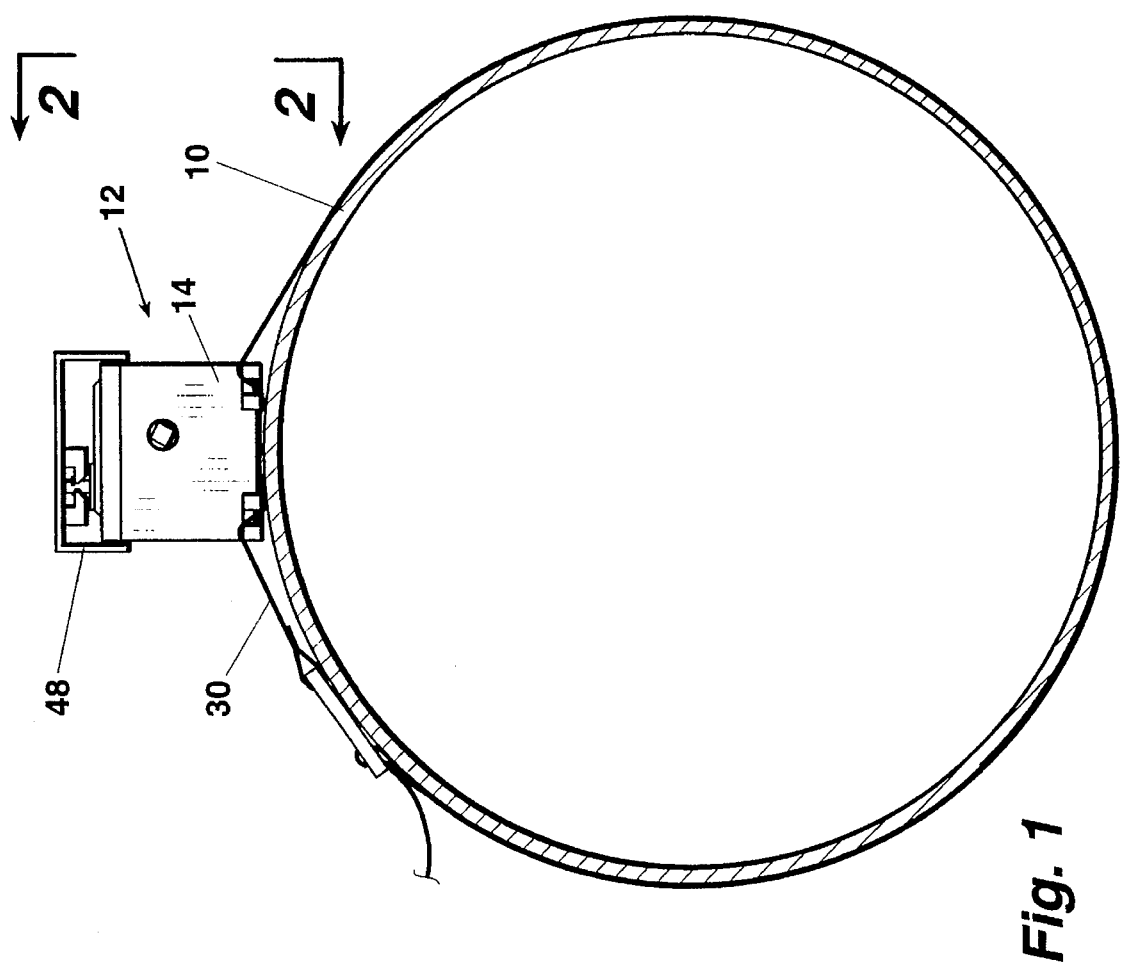
FIG. 1 is a cross-sectional view of a pipeline showing the apparatus for non-intrusively indicating the passage of a pig through the pipeline, the apparatus being attached to the exterior of the pipeline. The flag member is shown in the ready position.
Figure 6:
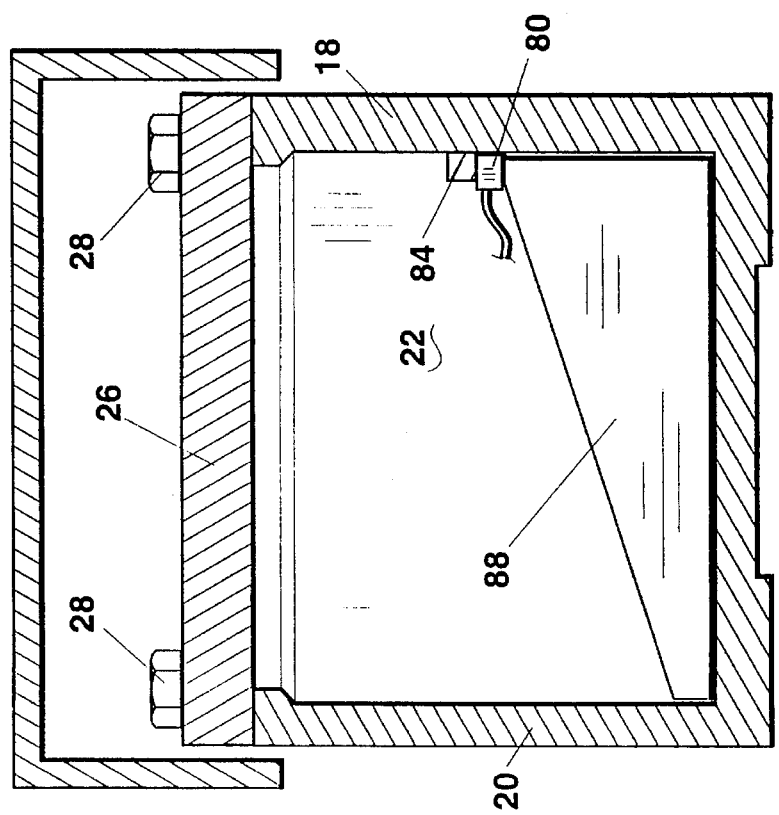
FIG. 6 is a cross-sectional view of an internal end wall of the housing taken along the line 6—6 of FIG. 5. The configuration of one portion of the armature is shown.

Referring now to the drawings, a pipeline is indicated by the numeral 10 in FIGS. 1 and 2. Supported on the exterior surface of pipeline 10 is the apparatus for indicating the passage of a pig that is the subject of this invention, the apparatus being generally indicated by the numeral 12. The pig signaling apparatus 12 has a housing 14 that is formed of non-paramagnetic material. Housing 14 is preferably of box-shaped configuration and is shown in cross-sectional views of FIGS. 5, 6, and 7. Housing 14 has a bottom 16, side walls 18 and 20, and end walls 22 and 24. The bottom, side walls, and end walls form an enclosure that is closed by a removable top 26 held in place by means of bolts 28.

As shown in FIGS. 1 and 2, housing 14 is adapted to be secured contiguous to the external cylindrical surface of pipeline 10. It is not imperative to this invention that housing 14 actually contacts the pipeline, but only that housing 14 be placed in sufficiently close proximity to the exterior of the pipe so that instrumentation within the housing, to be described, is responsive to changing magnetic field intensities as a magnet bearing pig passes through the pipeline. One means of supporting the housing to or in close proximity to pipeline 10 is by means of metal bands 30 and 32. To receive the metal bands, integral extensions 34 (four in number) are formed with housing 14. The integral extensions 34 each support a metal bar 36 that is adaptable to receive a band 30 to facilitate retaining housing 14 in close proximity to the exterior of pipeline 10.

FIG. 2 shows in dotted outline and rudamentally, a pig 38 within the interior of pipeline 10. The pig carries a magnet 40 that is shown diagrammatically. The function of magnet 40 is to alter the magnetic field in the vicinity of pipeline 10 as pig 38 travels through the pipeline. The indicator of this invention functions in response to magnet 40. Magnet 40 may be in the form of a plurality of magnets, and the magnet can be arranged in a number of different ways as long as it changes the magnetic field intensity sufficient to be detected by the magnetic sensor.

The pig signaling device of this invention can operate to provide an electrical signal indicating the passage of a pig. In the embodiment illustrated, the electric signal, which can be used in any way in which electrical signals are customarily used, can also be used to provide a visual signal to an operator. An actuator, generally indicated by the numeral 42, (see FIG. 5) is positioned within housing 14 and secured to top 26. Actuator 42 has a rotatable shaft 44 extending vertically upwardly from top 26. Shaft 44 has a radially extending bar 46.

Figure 7:
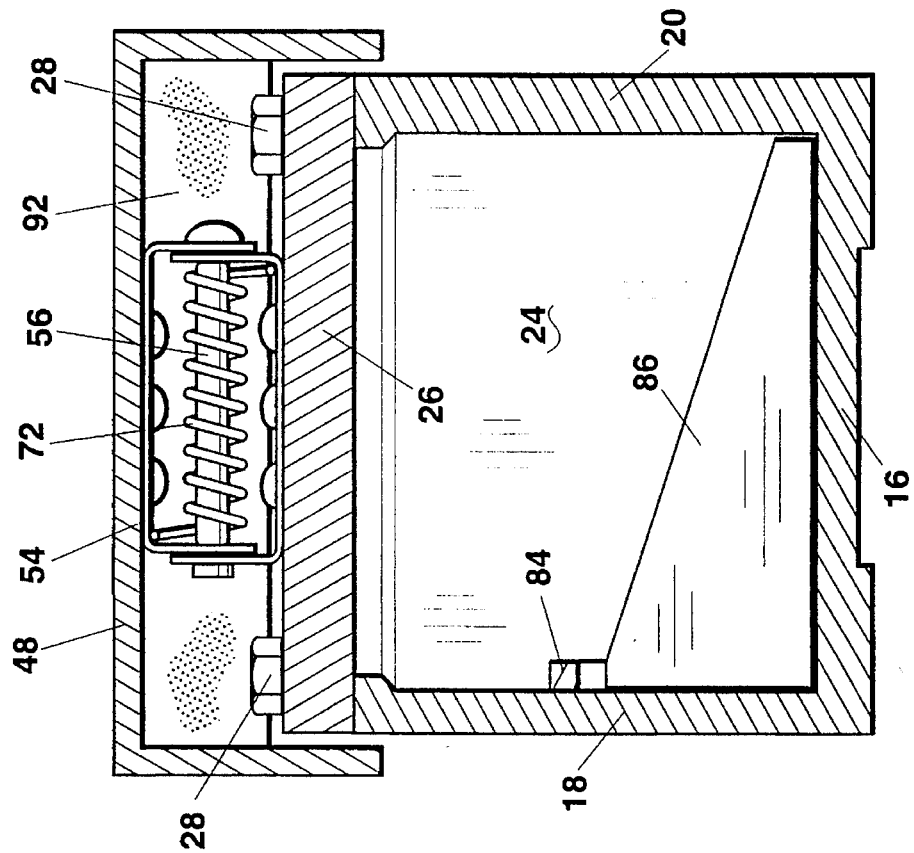
FIG. 7 is an internal end view of the opposite end wall of the housing as taken along the line 7—7 of FIG. 5.

Positioned exteriorly of and above housing 14 is flag member 48. In the illustrated arrangement, flag member 48 is generally planar and extends, when in the ready position, horizontally and above housing top 26. Flag member 48 is shown with integral downwardly extending sidewalls 50 and 52. Hinge 54, as best seen in FIGS. 5 and 7, has one portion attached to top 26 and the other portion attached to the underneath surface of flag member 48. Hinge 54 pivots the flag member about hinge pin 56.

As seen best in FIG. 8, first and second latch members 58 and 60 are supported to the underneath surface of flag member 48. Latch members 58 and 60 provide latching surfaces 62 and 64 respectfully that extend towards each other and provide an opening or slot 66 therebetween. Latching members 58 and 60 have inclined surfaces 68 and 70 respectively. These inclined surfaces slant towards slot 66. When bar 46 is aligned with slot 66, flag member 48 pivots by the action of spring 72 that surrounds hinge pin 56, to move the flag member to the operative position, providing a visual signal. Shaft 44 is retained by a spring (not shown) within actuator 42 so that it normally positions bar 46 to engage latching surfaces 62 and 64. Shaft 44 remains in this rotatable position until actuated by the detection of a changing magnetic field, as will be subsequentially described. To close flag member 48, that is, to move it from the operative to the ready position, the operator merely pivots it towards housing top 26. The inclined surfaces 68 and 70 engage bar 46 to rotate shaft 44 to allow the bar to pass through slot 66 after which the shaft returns to its position as indicated in FIG. 8, to retain flag member 48 in the ready position.

As previously stated, the apparatus for non-intrusively indicating the passage of a pipeline pig functions by detecting a change in the magnetic field surrounding the pipeline when a pig carrying a magnet passes the point of attachment of the apparatus to the pipeline. The method of detecting the change of intensity in the ambient magnetic field surrounding the pipeline will now be described, primarily by reference to FIGS. 5, 6, 7, and 11.

As shown in FIG. 5, retained within housing 14 is a battery pack 74 that supplies electrical energy to a circuit board 76. Conductors 78 extend from circuit board 76 to actuator 42.

Positioned within the housing is a solid-state Hall effect sensor 80. As is well known to those skilled in the art, a Hall effect device is highly sensitive to a magnetic field and changes its electrical characteristics in response to changes in a magnetic field. Hall effect sensor 80 may be such as UGN3503U manufactured by Allegro MicroSystems, Inc.

Figure 11:
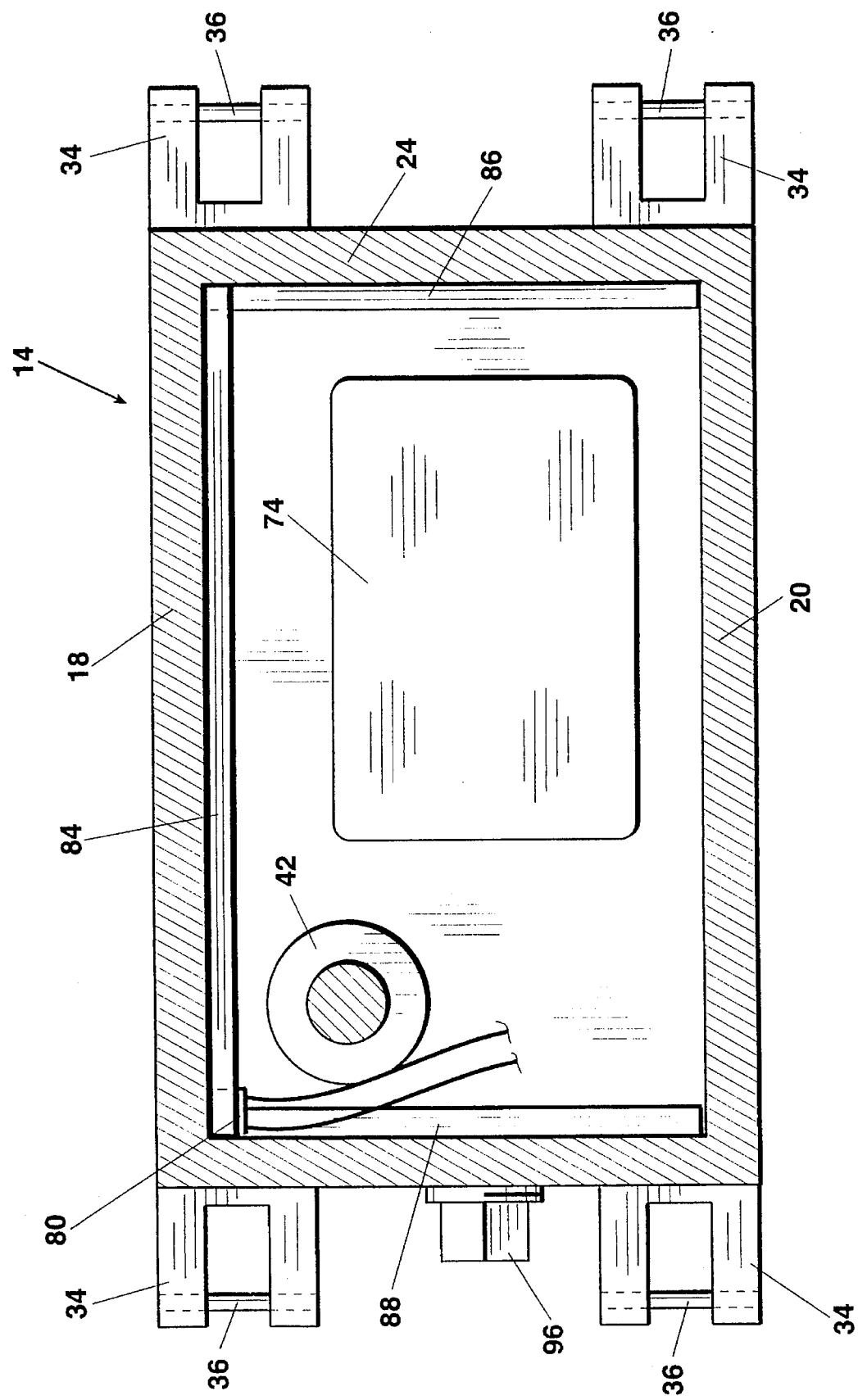
FIG. 11 is a planar cross-sectional view taken along the line 11—11 of FIG. 5 showing the lower internal portion of the housing and showing the arrangement of the armature around the peripheral interior surface of the housing and the relationship of the magnetic sensor to the armature.

This device is a relatively thin, solid-state element. To increase the sensitivity of the sensor to detect the passage of a magnet bearing pig, this invention provides an armature for concentrating the ambient magnetic field on Hall effect sensor 80. The armature is made up of pole pieces. As seen in FIG. 11, pole piece 84 is positioned adjacent the interior housing side wall 18; pole piece 86 is positioned adjacent end wall 24; and pole piece 88 is positioned adjacent end wall 22. Pole pieces 84 and 88 are slightly spaced apart to provide a gap that receives Hall effect sensor 80. Pole pieces 84, 86 and 88 form an armature having a gap therein in which sensor 80 is positioned. The pole pieces are all made of paramagnetic material, that is, material, such as soft iron or other specially alloyed material, that readily conducts magnetic lines of force. As shown in FIG. 2, when a pig 38 having magnet 40 therein passes beneath housing 14, the armature concentrates lines of flux so that the small change in the ambient magnetic field induced by magnet 40 is effective to cause a change in the electrical characteristic of sensor 80. This small change is amplified to create a voltage pulse within circuit board 76. Conductors 90 extend from sensor 80 to circuit board 76.

The cross-sectional area of various portions of the armature made up by pole pieces 84, 86 and 88 can vary. In the illustrated arrangement, pole pieces are formed of metal bars having essentially the same thickness but varying heights. As shown in FIG. 7, pole piece 86 is of greater height and, therefore, greater cross-sectional area as it approaches side wall 18. In contrast, pole piece 86 is of relative short height at side wall 20. An important aspect of this disclosure is that by varying the cross-sectional area of various portions of the armature the magnetic lines of flux can be concentrated in the Hall effect sensor.

Actuator 42 is a device which responds to an electrical pulse as applied by circuit board 76 to cause a rapid rotation of shaft 44 through an arc of about 35° to unlatch flag member 48. A device which accomplishes this result is exemplified by a product entitled Rotary Solenoid as manufactured by Ledex.

When a changing ambient magnetic condition is detected by sensor 80, caused by the passage of a magnet bearing pig through pipeline 10, a voltage pulse is sent by circuit board 76 to actuator 42 to cause shaft 44 to quickly rotate approximately 35°. When this occurs, bar 46 aligns with slot 66 between the first and second latch members 58 and 60, causing spring 72 to rapidly pivot flag member 48 to an upright position, as shown in solid outline in FIG. 2 and in dotted outline in FIGS. 3 and 4. This rapid upward movement is absorbed by an elastomeric member 92 affixed to the interior of flag member 48, as shown in FIGS. 3 and 5.

As has been stated, when a pipeline pig bearing a magnet passes beneath housing 14 positioned on or immediately adjacent to pipeline 10, an electrical pulse is provided by circuit board 76 which, in the illustrated embodiment, is employed to release flag member 48. However, it can be seen that this electrical pulse or electrical signal of a type determined by the circuitry employed in circuit board 76, can be used for other purposes. For this reason, a conductor can be connected to circuit board 76, such as in parallel with conductors 90, to provide an electrical signal to an ancillary apparatus (not shown) which could, for example, be a transmitting apparatus to transmit electromagnetic waves (radio waves), a signal that can be remotely received to indicate the passage of a pig.

To permit access to the interior of housing 14 when it is desired to have use of such electrical signal, an opening 94 is formed in one wall of the instrument, such as end wall 22. Plug 96 is normally used to close and make weatherproof housing 14 but can be removed to receive a conduit or other means of providing an access for conductors to make use of the electrical signal provided by circuit board 76.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for non-intrusively indicating the passage of a pig moving in a pipeline, the pig having a magnet carried thereby so that an ambient magnetic field adjacent the pipeline changes when the magnet containing pig passes through the pipeline, the apparatus comprising:

a housing adapted to be supported adjacent the external surface of a pipeline through which a magnet carrying pig moves, the housing having a rectangular internal peripheral surface formed of a plurality of side surfaces;

an armature formed of at least two pole pieces of paramagnetic material positioned adjacent at least two side surfaces of said housing internal peripheral surface, the pole pieces intersecting each other at substantially a right angle, the armature having a narrow gap therein;

a solid state magnetic sensing member positioned in said gap in said armature, the magnetic sensing member having changing electrical characteristics in response to changes in ambient magnetic field intensities; and indicating means responsive to said changing electrical characteristics of said magnetic sensing member to thereby indicate the passage of a magnet carrying pig through a pipeline.

2. An apparatus for non-intrusively indicating the passage of a magnet carrying pig in a pipeline according to claim 1 wherein said indicating means is in the form of a flag member movably supported to the exterior of said housing.

3. An apparatus for non-intrusively indicating the passage of a magnet carrying pig in a pipeline according to claim 2 wherein said flag member is pivotally supported to said housing and is spring biased towards an operative position and resettably retained in a ready position.

4. An apparatus for non-intrusively indicating the passage of a pig moving in a pipeline, the pig having a magnet carried thereby so that an ambient magnetic field adjacent the pipeline changes when the magnet carrying pig passes through the pipeline, the apparatus comprising:

a housing adapted to be supported adjacent the external surface of a pipeline through which a magnet carrying pig passes, the housing having an upper outer surface;

a rotatable shaft extending vertically upwardly through said housing upper surface;

sensing means within said housing of detecting a change in the ambient magnetic field when a magnet carrying pig passes through the pipeline;

circuit means within said housing providing an electrical signal in response to said sensing means;

actuator means positioned within said housing and connected mechanically to said rotatable shaft and electrically to said circuit means, the actuator means rotating said shaft in response to an electrical signal from said circuit means;

a flag member pivotally supported to the exterior of said housing normally retained in a ready position and biased towards an operative position; and latching means affixed to said flag member and releasably engageable with said rotatable shaft whereby in one rotatable position said shaft and latching means cooperate to retain said flag member in a ready position and in another rotatable position that is responsive to a said electrical signal from said circuit means said latching means is released from said shaft to permit said flag member to pivot to said operative position.

5. An apparatus for non-intrusively indicating the passage of a pig according to claim 4 wherein said shaft has a bar radially extending therefrom and wherein said latching means has opposed latching surfaces with a slot therebetween, said bar being receivable through said slot to permit said flag member to be pivoted to said ready position, said bar engaging said latching surfaces to retain said latching means and thereby said flag member in said ready position, said flag member pivoting to said operative position when said shaft is rotated in response to a said electrical signal.

6. An apparatus for non-intrusively indicating the passage of a pig according to claim 5 wherein said latching means includes a first and a second latch member supported to said flag member and adjacent to each other providing said opposed latching surfaces and said slot therebetween, each latching member having an inclined surface in the direction of said slot, the inclined surfaces serving to guide said bar into said slot when said flag member is pivoted to said ready position.

7. Apparatus for non-intrusively indicating the passage of a pig according to claim 4 wherein said housing is in the form of a substantially rectangular box having said upper outer surface and a lower outer surface adapted to fit against a pipeline, and wherein said flag member is generally planar and extends, when in said ready position, above and generally parallel to said housing top surface.

* * * * *